(12) United States Patent
Merz et al.

(10) Patent No.: US 6,602,947 B2
(45) Date of Patent: Aug. 5, 2003

(54) PRIMER

(75) Inventors: Peter W. Merz, Wollerau (CH); Shingo Tsuno, Zürich (CH)

(73) Assignee: Sika Schweiz AG, Zurich (CH)

( * ) Notice: Subject to any disclaimer, the term of this patent is extended or adjusted under 35 U.S.C. 154(b) by 0 days.

(21) Appl. No.: 09/843,754

(22) Filed: Apr. 30, 2001

(65) Prior Publication Data
US 2002/0002231 A1 Jan. 3, 2002

(30) Foreign Application Priority Data

Apr. 29, 2000 (EP) .............................. 00109302

(51) Int. Cl.[7] .............................. C08J 3/00; C08K 3/20; C08L 75/00
(52) U.S. Cl. ................ 524/589; 524/588; 524/507; 427/372.2; 427/385.5; 428/423.1; 525/123; 525/127; 525/455
(58) Field of Search ................ 524/588, 589, 524/507; 525/123, 127, 455; 427/372.2, 385.5; 428/423.1

(56) References Cited

FOREIGN PATENT DOCUMENTS

| EP | 262472 | A2 | 4/1988 |
|----|--------|----|----|
| EP | 430421 | A2 | 6/1991 |
| EP | 517471 | A2 | 12/1992 |
| JP | 6016999 | | 6/1994 |

*Primary Examiner*—Patrick D. Niland
(74) *Attorney, Agent, or Firm*—Burns, Doane, Swecker & Mathis, L.L.P.

(57) ABSTRACT

New primers for the improvement of the adhesion of cross-linking adhesive systems top polyolefinic thermoplastic materials such as e.g., polypropylene, polyethylene or EPDM are disclosed. Said primers, on the one hand are characterized by a simple method of production and good storage stability, on the other hand by good wetting and good homogeneous film forming characteristics, said film forming characteristics enabling a uniform thickness of the layer, leading to good adhesion qualities. Essential constituents of such primers are prepolymers based on hydrogenated polyisoprene diol.

29 Claims, No Drawings

PRIMER

CROSS REFERENCE TO RELATED APPLICATIONS

This application claims the priority of European patent application No. 00 109 302.0, filed Apr. 29, 2000, the disclosure of which is incorporated herein by reference in its entirety.

FIELD OF THE INVENTION

The present invention concerns primers for the improvement of the adhesion of plastics that are difficult to bond or seal, in particular of polyolefinic thermoplastics with one component or two component adhesive systems.

BACKGROUND OF THE INVENTION

Primers, also referred to as activators or adhesion promoters, are applied where the used adhesive does not achieve any, or only limited, adhesion to the substrate. Thereby, the adhesive system consisting of pre-treatment (primer) and adhesive are adapted to each other and to the substrate. Such primers can be physically hardening or chemically cross-linking. Pre-treatment (primer) systems for plastics such as e.g. polypropylene, polyethylene, EPDM (ethylene propylene diene terpolymers), polyamide, ABS (acrylonitrile butadiene styrene copolymers) etc., or anti-scratch treated plastics, such as e.g. polydimethylsiloxane coated polycarbonate, are known and described in patent documents.

According to EP 0 409 198, after the application of a primer comprising silyl-functionalized fumarates, the polyolefin must be attached thereto by (partial) melting.

In WO 92/09669 polyolefine primers are disclosed that comprise ethylene diamine derivatives and that in particular are suitable for cyanoacrylate adhesives.

EP 0 295 930 discloses a primer comprising diazobicyclo compounds or triazabicyclo compounds suitable for cyanoacrylate adhesives. Said primer does not form a film and therefore only results in a minor improvement of the adhesion; furthermore, said primer is unsuitable for adhesives that are less rigid then cyanoacrylate adhesives.

In EP 0 703 285 a mixture consisting of chlorinated polyolefin and flexibilized epoxy resin is disclosed as primer for polyolefins. Since said primer is not cross-linking, its heat stability is insufficient. The epoxy resin furthermore has a low affinity to polyolefins. In addition, the presence of chlorine is critical in view of legal regulations.

In the patent documents JP 3 239 761 or JP 62 095 326, respectively, reaction products of hydrogenated polybutene-diol with polyisocyanates are desdribed. The low solubility of the hydrogenated polybutadiendiol in a solvent, however, affects the productivity, and because of separation and gel formation the storage stability is limited.

BRIEF SUMMARY OF THE INVENTION

Hence, it is a general object of the invention to provide a primer for the improvement of the adhesion between polyolefinic plastics and adhesives or sealants, respectively, that overcomes the above described disadvantages.

Said goal has been achieved by providing a primer comprising a polyol provided with reactive terminal groups, whereby said polyol comprises hydrogenated polyisoprenediol.

DETAILED DESCRIPTION OF THE INVENTION

Such primer contains or consists of a pre-polymer that is based on a polyol provided with reactive terminal groups, whereby said polyol contains or consists of a hydrogenated polyisoprenediol. Preferred reactive terminal groups are isocyanate groups or silane groups.

For specific applications, and in order to enhance the storage stability, the reactive terminal groups may be protected, such that they gain their reactivity after performed deprotection or deblocking, respectively, e.g. due to heat application.

Preferred primers comprise the pre-polymer together with a suitable solvent.

The inventive primer has good affinity to appolar plastics, in particular to polyolefinic thermoplastic substrates such as polyethylene, polypropylene, polyvinylchloride, ABS or EPDM. Because of the chemical cross-linking and film-forming characteristics it is heat resistant, does not comprise any components that together with the adhesive could initiate a degrading reaction, and shows very good wetting to different substrates as well as excellent potlife. Furthermore, it is possible to produce a solvent and pre-polymer comprising primer by a simple method, since the pre-polymer that is based on hydrogenated polyisoprenediol (=HPIPOL) is very well soluble in aromatic or non-aromatic solvents in high concentrations at room temperature. This leads, on the one hand to an improved productivity and, on the other hand, because of the good compatibility and reduced tendency to separate, to an improvement of the storage stability. Furthermore, the good solubility of the HPIPOL allows a high solid content in the inventive primer and effects goos homogeneous film characteristics with good quality of the adhesion. Non-homogeneous films with differing thickness lead to a reduced and insufficiently reproducible quality of the adhesion.

The inventive primer is based on humidity curable binders that are obtained by reaction of the HPIPOL (see above) with a compound that comprises at least one OH-reactive group and at least one further reactive group, whereby the at least one further reactive group either directly represents the reactive terminal group of the pre-polymer, or a group that in a further step can be transferred into said reactive terminal group.

A preferred binder is obtained through reaction of the HPIPOL with a polyisocyanate, whereby the ratio of OH:NCO is between 1:2 and 1:10, preferably between 1:2.5 and 1:3.5. Corresponding ratios are also suitable or preferred, respectively, for the production of a respective silane-terminated pre-polymer. Such prepolymers are preferably incorporated into a non-polar aliphatic or aromatic solvent, such as e.g. cyclohexane, xylene etc., or in solvent mixtures, such as e.g. ethylacetate and heptane, in a concentration of 0.5 to 50% by weight, in particular of 5 to 15% by weight.

Possible polyisocyanates are 4,4'-diphenylmethane diisocyanate (MDI), 2,4-toluene diisocyanate, isophorone diisocyanate, hexamethylene-diisocyanate, tri (phenylisocyanate)thiophosphate, triphenylmethane-4,4',4"-triisocyanate etc., or mixtures thereof.

The reaction of the polyol with the polyisocyanate takes place in known manner under nitrogen and stirring at optionally enhanced temperature and optionally in the presence of a catalyst, whereby the ratio OH:NCO is between 1:2 to 1:10, preferably between 1:2.5 to 1:3.5. The polyol, prior to said reaction, is homogenized in the solvent.

In a further step, the isocyanate groups of the prepolymer can be transferred either by means of aminosilane or mercapto-silane at least partially and preferably entirely into a humidity reactive silane groups terminated prepolymer, or with hydroxyethyl(meth)acrylate in an acrylate group terminated prepolymer, the double bonds of which are e.g. radically cross-linking in the presence of an initiator.

For example, the HPIPOL can be reacted with isophorone diisocyanate (IPDI) or toluene diisocyanate (TDI) to isocyanate terminated pre-polymer and said polymer—if desired—can then be reacted with aminosilane or mercaptosilane to a silane group terminated pre-polymer.

It is of course also possible to directly insert the silane-endgroup by choosing a suitable compound. For example HPIPOL can be reacted with isocyanatopropyltrimethoxysilane.

The polyol, HPIPOL, necessarily present in the prepolymer used according to the invention, can be mixed with other polyols such as e.g. polyethers, polyesters, or other hydroxygroups functionalised hydrocarbons, whereby the amount of HPIPOL referred to the whole polyol should at least be 10% by weight, preferably at least 40% by weight. By using mixtures, the film forming characteristics of the primers of the present invention to each substrate can be optimized. Such polyol mixtures can be obtained by mixing the polyols and then introduction of the reactive end groups, or by mixing of prepolymers from different polyols.

Investigations have shown that HPIPOL, mixed with e.g., a hydrogenated polybutadiene-diol(HPBDOL) in a ratio of 1:0.1 to 1:3, in particular in a ratio of 1:0.3 to 1:1 results in a very good binder or primer, respectively. Thereby, conflicting characteristics can be very good balanced. For example, on the one hand an economic production (no melting of large amounts of solid polyols) and, because of low separation tendency, a good storage stability are obtained. On the other hand, an optimal potlife that guarantees a good wetting or surface penetration, respectively, of the inventive primer is provided whereby nevertheless a dry film formation in short time is achieved.

Primers with high solid content of HPBDOL (e.g. >10% by weight HPBDOL/MDI in xylene), because of the separation tendency during the drying time, result in a film with non-homogeneous characteristics such as different thickness, leading to a reduced and varying adhesion quality.

The dry film formation is a necessity for the application of either, according to the respective need, a further primer or the adhesive.

The primer can be applied to a substrate by methods such as dipping, spraying and painting. It is also within the scope of the present invention that the substrate treated with the primer is subjected to enhanced temperature or enhanced humidity or to both, enhanced temperature and enhanced humidity.

Below some examples (see table below) are shown that further illustrate the invention, that, however, shall not restrict the scope of the invention in any way. The primers according to the invention, examples 1, 2 and 3, are easily producible, storage stable, they have good adhesion performance and they are stable in hot (70° C.) and wet (relative humidity 100%) conditions.

The solubility of the HPBDOL/MDI in reference 4 and the end of the HPIPOL/MDI (inventive example 2) is clearly different. While HPBDOL/MDI can only be dissolved in an aromatic solvent, but not in an aliphatic solvent, such as e.g. a mixture consisting of cyclohexane and ethylacetate (leads to separation), HPIPOL/MDI, without any problems, can be dissolved in aromatic and aliphatic solvents and solvent mixtures.

From the state of the art, it is known that HPBDOL/MDI is only well soluble in an aromatic solvent such as xylene up to an amount of at most 10% by weight. At >10% by weight separation tendency or the danger of gelling (pudding formation, see reference 2) exists.

The pre-polymer HPIPOL/MDI used according to the present invention is soluble in amounts of over 90% by weight, preferably in an aromatic solvent, such as xylene. HPIPOL/MDI is also soluble in aliphatic solvents, such as preferably a mixtures of cyclohexane and ethylacetate in concentrations of >20% by weight. The adhesion quality is practically not influenced by the kind of the solvent used, whether aromatic or aliphatic, the more so since the solvent, after application, evaporates in short time. In the following table PL means potlife and TSR means combined tension and shear resistance.

While there are shown and described presently preferred embodiments of the invention, it is to be distinctly understood that the invention is not limited thereto but may be otherwise variously embodied and practiced within the scope of the following claims.

| Parameter | Reference 1 | Reference 2 JP62095326 | Reference 3 | Reference 4 JP62095326 | Reference 5 EP0703285 | Ex. 1 | Ex. 2 | Ex. 3 |
|---|---|---|---|---|---|---|---|---|
| Epoxy-Poly BD (MW = 1800/Epoxy = 460) (Elf (Atochem) |  | 0 | 0 | 0 | 10 | 0 | 0 | 0 |
| Chlorinated Polyolefin (Eastman Chemical) | no pretreatment | 0 | 20 | 0 | 10 | 0 | 0 | 0 |
| HPIPOL (OH-number = 0.9 meq/g) |  | 0 | 0 |  | 0 | 20 | 10 | 7 |
| HPBDOL (OH-number = 0.8 meq/g) |  | 20 | 0 | 10 | 0 | 0 | 0 | 3 |
| MDI (Bayer) |  | 8 | 0 | 4 | 0 | 8 | 4 | 4 |
| Xylene | pure PP | 72 | 80 | 86 | 80 | 72 | 86 | 86 |
| Total [g] |  | 100 | 100 | 100 | 100 | 100 | 100 | 100 |
| Production (critical = bad solubility characteristics) | — | gelled (pudding) | critical | critical | critical | very good | very good | good |
| Storage Stability | — | not o.k. | good | critical (separation) | good | good | good | good |
| PL (≈50 μm film dryness at 20° C. examined with finger) | — | — | ≈5 min. | ≈5 min. | ≈20 min. | ≈20 min. | ≈15 min. | ≈10 min. |
| Adhesion with Sika-2K PUR (MG2K) on PP TSR (25 × 10 mm/d = 0.5 mm) [MPa] | no adhesion | — | good (≈2.8) | good (>3) | bad (<0.1) | good (>3) | good (>3) | good (>3) |
| Adhesion with Sika-2K Acrylate on PP | no adhesion | — | medium | good | bad | good | good | good |

-continued

| Parameter | Reference 1 | Reference 2 JP62095326 | Reference 3 | Reference 4 JP62095326 | Reference 5 EP0703285 | Ex. 1 | Ex. 2 | Ex. 3 |
|---|---|---|---|---|---|---|---|---|
| TSR (25 × 10 mm/d = 0.5 mm/100 mm/min.) [MPa] | | | (≈1.5) | (≈3) | (<0.1) | (>3) | (>3) | (>3) |
| Adhesion (additionally SikaPrimer209) with Sikaflex255 on PP | no adhesion | — | medium (<1) | good (≈3) | bad (<0.1) | good (≈3) | good (≈3) | good (≈3) |
| TSR (25 × 10 mm/d = 3 mm/100 mm/min.) [MPa] | | | | | | | | |
| Heat Restance (80° C.) | — | — | bad | good | bad | good | good | good |

What is claimed is:

1. Primer comprising a prepolymer, said prepolymer being a polyol comprising reactive terminal groups, whereby said polyol is or contains hydrogenated polyisoprene-diol (HPIPOL).

2. The primer of claim 1 wherein the reactive terminal groups are isocyanate groups.

3. The primer of claim 1 wherein the reactive terminal groups are silane groups.

4. The primer of claim 1 wherein the pre-polymer is obtained by reaction of HPIPOL with a polyisocyanate, whereby the ratio OH:NCO is between 1:2 and 1:0.

5. The primer of claim 1 wherein the prepolymer is obtained by reaction of HPIPOL with a polyisocyanate selected from the group consisting of 4,4-diphenylmethane diisocyanate (MDI), 2,4-toluene diisocyanate, isophorone diisocyanate, hexamethylene diisocyanate, tri(phenylisocyanate)thiophosphate, triphenylmethane-4,4',4"-triisocyanate and mixtures thereof.

6. The primer of claim 1 wherein the pre-polymer is obtained by reaction of an isocyanate-terminated pre-polymer with aminosilane and/or mercaptosilane.

7. The primer of claim 1 wherein the polyol is a mixture of HPIPOL with at least one further polyol selected from the group consisting of polyetherpolyols, polyester-polyols, hydrocarbons functionalized with hydroxygroups, and mixtures thereof.

8. The primer of claim 7 wherein the HPIPOL is present in an amount referred to the weight of the whole polyol of at least 10% by weight.

9. The primer of claim 7 wherein the at least one further polyol is hydrogenated polybutadiene-diol.

10. The primer of claim 1 that comprise solvents.

11. The primer of claim 10 wherein the prepolymer is present in amounts of 0.5–50% by weight referred to the weight of the primer.

12. Method for the production of a primer of claim 10 wherein a pre-polymer being a polyol comprising reactive terminal groups, whereby said polyol is or contains hydrogenated polyisoprene-diol (HPIPOL) and is dissolved in a solvent in the desired amount.

13. Method for the pre-treatment of a substrate wherein the primer of claim 1 is applied to said substrate.

14. The method of claim 13 wherein the substrate treated with the primer is subjected to enhanced temperature or enhanced humidity or enhanced temperature and humidity.

15. The method of claim 13 wherein the treatment is performed by dipping, spraying or painting.

16. The method of claim 13 wherein the substrate is non-polar plastics.

17. The method of claim 16, wherein the polyolefinic thermoplastic substrate is selected from the group consisting of polyethylene, polypropylene, polyvinylchloride, ABS or EPDM.

18. The primer of claim 1 wherein the pre-polymer is obtained by reaction of HPIPOL with a polyisocyanate, whereby the ratio OH:NCO is between 1:2.5 and 1:3.5.

19. The primer of claim 7 wherein the HPIPOL is present in an amount referred to the weight of the whole polyol of at least 40% by weight.

20. The primer of claim 7 wherein the at least one further polyol is hydrogenated polybutadiene-diol in amounts such that the ratio of HPIPOL to hydrogenated polybutadiene-diol is from 1:0.1 to 1:3.

21. The primer of claim 7 wherein the at least one further polyol is hydrogenated polybutadiene-diol in amounts such that the ratio of HPIPOL to hydrogenated polybutadiene-diol is from 1:0.3 to 1:1.

22. The primer of claim 1 that comprise non-polar solvents selected from aromatic hydrocarbons, aliphatic hydrocarbons or mixtures thereof.

23. The primer of claim 1 that comprise non-polar solvents selected from aliphatic hydrocarbons or mixtures thereof.

24. The primer of claim 10 wherein the prepolymer is present in amounts of 5 to 15% by weight referred to the weight of the primer.

25. The method of claim 13 wherein the substrate is a polyolefinic thermoplastic substrate.

26. The primer of claim 1 wherein the primer is a humidity curable primer.

27. The primer of claim 1 wherein the prepolymer is a humidity curable prepolymer.

28. The primer of claim 1 wherein the reactive terminal groups of the prepolymer are unprotected.

29. The primer of claim 1 wherein the adhesion of a subsequently applied coating, adhesive and/or sealant to a substrate is improved compared to the adhesion of the coating, adhesive and/or sealant without the primer.

* * * * *